United States Patent [19]

Cabestany et al.

[11] 3,957,739

[45] May 18, 1976

[54] PROCESS OF PRODUCTION OF WATER-SOLUBLE LINEAR POLYMERS OF VERY HIGH MOLECULAR WEIGHT

[75] Inventors: Jean Cabestany, Seine-Saint-Denis; Erich Schaffer, Oise, both of France

[73] Assignee: Nobel Hoechst Chimie, Puteaux, France

[22] Filed: Nov. 27, 1974

[21] Appl. No.: 527,764

[52] U.S. Cl. .................. 526/207; 260/29.6 WQ; 526/210; 526/240; 526/303; 526/317; 526/328; 528/501
[51] Int. Cl.² ................. C08F 20/06; C08F 20/56
[58] Field of Search ....... 260/80 M, 80.3 N, 89.7 R, 260/29.6 WQ

[56] References Cited
UNITED STATES PATENTS

| | | | |
|---|---|---|---|
| 3,211,708 | 10/1965 | Zimmerman et al. | 260/78.5 |
| 3,278,506 | 10/1966 | Chamot et al. | 260/89.7 |
| 3,284,393 | 11/1966 | Vander Hoff et al. | 260/29.6 |

FOREIGN PATENTS OR APPLICATIONS

| | | |
|---|---|---|
| 2,140,116 | 12/1973 | France |

OTHER PUBLICATIONS

Kirk–Othmer Encyclopedia of Chem. Technology 2nd ed., 1965 pp. 127, 131, Vol. 8.

*Primary Examiner*—John Kight, III
*Attorney, Agent, or Firm*—Karl W. Flocks

[57] ABSTRACT

A process of production of linear, water-soluble polymers and co-polymers of very high molecular weight in powder form, from monomers which are themselves soluble in water comprises operating in emulsion with an inversion of phase during the course of the operation with, as solvent, a hydrocarbon giving with water an azeotrope boiling at a temperature lower than 100°C, and with, as emulsifying agent, a non-ionic emulsifying agent having a H.L.B between 8 and 13 in a proportion of 1.5 to 5 % of the total weight of the monomers and the solvents, initiating the polymerization at a temperature lower than 35°C by adding the quantity of initiator of the Redox type to the whole of the reactants and especially carrying out the polymerization in a closed vessel without external cooling, until the maximum temperature is reached.

7 Claims, No Drawings

PROCESS OF PRODUCTION OF WATER-SOLUBLE LINEAR POLYMERS OF VERY HIGH MOLECULAR WEIGHT

The present invention relates to a process of production of linear, water-soluble polymers and co-polymers of very high molecular weight in powder form, from monomers which are themselves soluble in water.

It is known to manufacture water-soluble polymers and co-polymers by carrying out the polymerization in emulsion, in the presence of an organic solvent insoluble or slightly soluble in water. The emulsion may be either an emulsion of the oil-inwater type, that is to say an emulsion of the solvent in the aqueous solution of the monomers as in French Pat. No. 1,306,161, or an inverted emulsion, that is to say an emulsion of an aqueous solution of the monomers in the solvent, as in French Pat. No. 1,202,929.

While these methods of polymerization in emulsion provide a better control of the exothermic polymerization reaction and prevent the formation of imide groups at the expense of amide groups in the polymerizations which utilize acrylamide, they do not however permit the production in particular of polyacrylamides utilizable as flocculation agents, in consequence either of the insufficient molecular weight or of the non-linear structure of the polymers.

In addition, it has recently been proposed in French Pat. No. 2,140,116 to polymerize in emulsion by carrying out a phase inversion during the course of the polymerization and utilizing perchlorethylene as a solvent in order to obtain better control of the exothermicity of the polymerization. There are thus obtained polymers or co-polymers of relatively high molecular weight, but the use of perchlorethylene is not without disadvantages due to its radical transfer activity which does not make it possible to produce polymers with a high degree of polymerization.

It has been found that is was possible to obtain, in a surprising manner, linear polymers or co-polymers of very high molecular weight (of at least 5 millions weight average molecular weights), in powder form, readily soluble in water and more particularly polyacrylamides having excellent flocculation properties, by (1) operating in emulsion with an inversion of phase during the course of the operation on condition that there is employed (a) as a solvent, a saturated aliphatic hydrocarbon, a cyclanic hydrocarbon or an aromatic hydrocarbon giving with water an azeotrope boiling at a temperature lower than 100°C, and (b) as the emulsifying agent, a non-ionic emulsifying agent with a hydrophilous-lipophilous index, hereinafter referred to as H.L.B. (hydrophilic-lipophilic balance), between 8 and 13 in a proportion of 1.5 to 5 % of the total weight of the monomers and the solvents, (2) initiating the polymerization at a temperature lower than 35°C by adding the quantity of initiator of the REDOX type to the whole of the reactants and (3) especially carrying out the polymerization in a closed vessel without external cooling, until the maximum temperature is reached.

According to other characteristics:
— The polymer or co-polymer formed is de-hydrated by azeotropic distillation before the separation of the reaction medium;
— The polymerization is carried out on the whole of the monomers, preferably in an aqueous solution at a concentration of between 40 % and saturation, containing in emulsion a quantity of organic solvent such that the solvent/aqueous phase ratio is between 2 and 5, and utilizing as the REDOX system, 0.1 to 1 % by weight of oxidizing agent and 0.05 to 0.5 % by weight of reducing agent with respect to the monomer.

The monomers which can be polymerized by the process of the invention are water-soluble monomers such as acrylamide, methacrylamide, the acrylic and methacrylic acids, their salts, the salts of quaternary ammonium derived from those preceding, etc.

The polymerization by means of the process of the invention can be carried out on a single monomer or on a mixture of monomers of different natures.

According to the process of the invention, the emulsifying agent to be employed is chosen in such manner as to obtain a definite inversion of phase during the course of polymerization. It is for this reason that use is made of an emulsifying agent having an H.L.B. between 8 and 13. In fact, if the H.L.B. is too low, there is obtained an oil-in-water emulsion which is too unstable, which is contrary to the desired result, while if the H.L.B. is too high, a stable oil-in-water emulsion is obtained but there is not produced any definite inversion of phase during the course of polymerization, and the polymer obtained is not of such good quality. In addition, there may be produced a mass setting of the polymer due to the fact that the whole of monomers is charged in one single operation.

With an H.L.B. of 8 to 13, there is obtained at the start an oil-in-water emulsion which is sufficiently stable and which definitely reverses to a water-in-oil emulsion during the course of polymerization. Non-ionic emulsifying agents which are particularly suitable are the oxyethylenated alkyl phenols and fatty alcohols of H.L.B. comprised between 8 and 13. According to the invention, the emulsifying agent must be used in a relatively large quantity in order to obtain a definite inversion of phase. This quantity may vary from 1.5 to 5 % of the total weight of the mixture of the monomers and solvents.

The organic solvents insoluble or only slightly soluble in water which are suitable for the process of the invention must not dissolve either the monomer to be polymerized or the polymer obtained; they must furthermore give with water an azeotrope preferably boiling below 100°C. These are for example saturated aliphataic hydrocarbons, cyclanic hydrocarbons or aromatic hydrocarbons. The petroleum fraction with a boiling point below 100°C, heptane, octane, benzene, cyclohexane are the preferred solvents.

The initiating temperature of the polymerization must be as low as possible, taking account of the nature of the initiator, the respective proportions of solvent and water and the freezing temperature of the various components; it must not exceed 35°C.

The polymerization initiators utilizable are REDOX systems for example the couples persulphate-metabisulphite or bisulphite, permanganate-oxalic acid, hydrogen peroxide-ascorbic acid, persulphate-ascorbic acid, chlorate-sulphite, bromate-sulphite, etc.

The polymerization is initiated under nitrogen, after deoxygenation of the reactants, either by extraction of gas under vacuum or by bubbling-through nitrogen, by introduction of the REDOX system. The introduction of the initiator is carried out on the previously prepared oil-in-water emulsion.

According to the process of the invention, as soon as the polymerization has started, it is allowed to continue in a closed vessel, without cooling. By this means, there are attained maximum temperature at which, if the operation were carried out to reflux, products of lower quality would be obtained, especially with acrylamide, which has a tendency under these conditions to form imide groups resulting in cross-linking of the polymer. The temperature may reach 90°C and the pressure 2 bars. During the rise in temperature, there is observed an abrupt fluidification of the reaction medium corresponding to the inversion of phases. This invention is produced when the rate of conversion of the monomer to polymer is 40 to 60 % and the temperature is from 40° to 50°C. When the maximum temperature has been reached, the reaction medium is kept for about one hour longer while stirring, at between 70° and 80°C, by any appropriate means.

The azeotropic dehydration of the polymer or the co-polymer formed enables it to be conveniently separated from the reaction medium by filtration or drying, whereas direct separation without previous dehydration is very difficult. This dehydration is carried out in a neutral or slightly alkaline medium.

It has been found that by carrying out the polymerization according to the process of the invention, in spite of the relatively high temperatures reached during the course of polymerization, there were obtained, in a surprising manner, linear products which were perfectly soluble in water and of very high molecular weight, especially in the case of acrylamide.

The granular and porous form of the polymer obtained by azeotropic dehydration permits of rapid dissolving in water.

Amongst the advantages of the method according to the invention there may be cited:

— The simplification of the installation required for the polymerization, due to the elimination of the control of the temperature by cooling during the course of the polymerization;

— the elimination of the limitation of the reactor volume due to cooling difficulties when the surface ratio of the walls to the volume is reduced;

— the elimination of the risk of the reaction getting out of control;

— the simplification of the method of operation due to the charging of the whole of the reactants at the beginning of the operation;

— the facility of separating-out the polymer in powder form.

The polymers and co-polymers obtained by the process of the invention may be employed in all the usual applications of products of this type in which there is a need for a product of very high molecular weight, readily soluble in water, for example as a flocculation agent, as a thickener for adhesives, as a binding agent, etc. The poly-acrylamides, particularly by reason of their linear structure have remarkable properties as flocculation agents.

The examples which follow are given in order to illustrate the process of the invention, but they are not in any way restrictive.

EXAMPLE 1

Into a stainless steel reactor of 250 liters, there are charged 142 kg of cyclohexane, 5,4 kg of polyoxyethylenated nonyl-phenol with an H.L.B. of 10.9, 22.5 kg of acrylamide, 22.5 kg of water and 85 ml of 4N sulphuric acid. By stirring, there is obtained a transparent emulsion having a viscosity of 45 poises.

After elimination of the oxygen by bubbling through with nitrogen, the mixture is brought to 30°C and there are introduced 5 grams of sodium chlorate and 2.5 grams of sodium sulphite.

There is produced a thickening of the reaction medium which indicates the beginning of polymerization. The passage of the nitrogen is then stopped and the apparatus is hermetically closed. The reaction is allowed to develop without cooling; the temperature of the reaction medium then passes from 30° to 78°C and the pressure is 1 bar.

During this development, a definite inversion of phases is produced. The reactor is kept for 1 hour longer at 75°C while stirring, re-heating being carried out as necessary.

After the addition of 400 ml. of 2N sodium bicarbonate, an azeotropic carrying away of water is effected. The polymer separates out in the form of a powder which is filtered and dried with pulsated air.

The product obtained is very soluble in water; its 1 % solution has a viscosity of 700 centipoises and is very ropy.

EXAMPLE 2

Into a stainless steel reactor of 300 liters, there are charged 155 kg of cyclohexane, 7 kg of oxyethylenated nonylphenol with an H.L.B. of 12.3, 44 kg of water, 40 kg of acrylamide and 120 ml. of 4N sulphuric acid.

The emulsion formed has a viscosity of 12 poises.

The oxygen is eliminated by extraction under vacuum, and then a flow of nitrogen is passed and there are introduced at 20°C, 6 grams of sodium chlorate and 3 grams of sodium sulphite. A thickening is produced and the passage of the nitrogen is then stopped, the reactor is closed and the reaction is permitted to develop. The temperature rises to 86° C and the pressure to 1.8 bars.

During the course of this development, there is produced a fluidification of the mass which corresponds to the inversion of the emulsion. The reactor is maintained for 1 hour at 70° C while stirring and heating as necessary. The suspension of polymer is then dehydrated by azeotropic carrying away after neutralization. 41 kg of water are distilled and the polymer separates out in the form of powder which is filtered and dried. There is thus obtained a product which is very soluble in water; its 1 % solution has a viscosity of 550 centipoises and it is very ropy.

EXAMPLE 3

Into a stainless steel reactor of 300 liters, there are charged 140 kg of heptane A, 6.4 kg of polyoxyethylenated octylphenol with an H.L.B. of 10, 40 kg of acrylamide, 44 kg of water and 80 ml of 25 % sulphuric acid.

A flow of nitrogen is passed so as to eliminate the oxygen, and then there are introduced at 20°C 8 grams of sodium chlorate and 4 grams of sodium sulphite.

The polymerization is indicated by a thickening. The passage of the nitrogen is then stopped and the reactor is closed. During the course of the rise in temperature, a fluidification takes place and after 50 minutes the temperature reaches 84°C. The mixture is maintained for one more hour at 80°C while stirring and heating if necessary. There are then added 150 ml. of 2N sodium bicarbonate and azeotropic distillation is effected until all the water is completely eliminated. After drying, the powdered product dissolves readily in water; its 1 % solution has a viscosity of 600 centipoises and it is very ropy.

The flocculent powder of the polymer obtained is measured by a sedimentation test of kaolin at a concentration of 25 grams per liter in water containing 3 p.p.m. of polymer. There is obtained a half-sedimentation time of 30 seconds, whereas without polymer the half-sedimentation time is 50 minutes.

EXAMPL 4

Into a stainless steel reactor of 300 liters there are charged 145 kg of heptane A, 6.5 kg of polyoxyethylenated octyl-phenol with an H.L.B. of 10, 36 kg of distilled acrylic acid and 36 kg of water. The emulsion formed is neutralized with gaseous ammonia to a pH value of 8. After passing nitrogen through the mixture to eliminate oxygen, there are introduced at 20°C, 10.8 grams of ammonium persulphate and 5.4 grams of sodium metabisulphite.

There is observed a thickening of the reaction medium. The passage of the nitrogen is then stopped and the reactor is closed. The polymerization is permitted to develop and after inversion of the emulsion, the temperature reaches 75°C in 40 minutes. The mixture is kept at this temperature for one hour more while stirring and heating if necessary, after which the water is eliminated by azeotropy and the powder obtained is filtered and dried. This powder is very rapidly soluble in water; its viscosity at 1 % in soda at 10 grams per liter is 4800 centipoises.

EXAMPL 5

The operation is carrid out under the same conditions as in Example 4, but the acrylic acid is replaced by 25 kg of acrylamide and 11 kg of acrylic acid.

There is obtained a water-soluble polymer, the 1 % solution of which in soda at 10 grams per liter has a viscosity of 5500 centipoises.

EXAMPL 6

A test identical with Example 2 is carried out, replacing the polyoxyethylenated nonyl-phenyl by a fatty coconut alcohol polyoxyethylenated having an H.L.B. of 10.4.

There is obtained a polymer which is very soluble in water and the viscosity of the 1 % solution of which is 750 centipoises.

It will of course be understood that the present invention has been described purely by way of explanation and not in any restrictive sense, and that any useful modification may be made thereto without departing from its scope as defined by the appended claims.

We claim:

1. In a process for preparing linar acrylic and methacrylic polymers and copolymers in powder form soluble in water comprising the emulsion polymerization, in an inert atmosphere, of water soluble corresponding monomers in the presence of an organic solvent substantially insoluble in water and giving with water an azeotropic mixture boiling below 100°C, and of an emulsifying agent, with phase inversion during the polymerization, the improvement in which
   1. the starting emulsion with an aqueous phase and a non-aqueous phase is an oil-in-water type emulsion,
   2. the organic solvent used is selected from the group consisting of saturated aliphaic hydrocarbons, cyclanic hydrocarbons and aromatic hydrocarbons,
   3. the emulsifying agent is a non-ionic emulsifying agent having an H.L.B. between 8 and 13 and is used in an amount of from 1.5 to 5% with respect to the total weight of monomers + solvents,
   4. the polymerization is initiated at a temperature below 35°C by adding a minimum amount of a redox system initiator consisting of 0.1 to 1% by weight of an oxidant and 0.05 to 0.5% by weight of a reducing agent with respect to the total weight of monomers
   5. said polymerization is carried out in a closed vessel, without cooling until the maximum reaction temperature is obtained, and
   6. obtaining the polymers in powder form having a very high molecular weight.

2. The improvement in accordance with claim 1 in which the amount of monomers in the aqueous phase is from 40 % to the saturation amount.

3. The improvement in accordance with claim 1 in which the solent/aqueous phase ratio is from 2:1 to 5:1.

4. The improvement in accordance with claim 1 in which said water soluble monomers are selected from the group comprising acrylamide, methacrylamide, acrylic acid, methacrylic acid, the water soluble salts thereof and their mixtures.

5. The improvement in accordance with claim 1 in which said emulsifying agent is selected from the group comprising polyoxyethylenated alkylphenols and fatty alcohols.

6. The improvement in accordance with claim 1 in which said organic solvent is selected from the group comprising heptane, octane, gasoline fractions boiling below 100°C, benzene and cyclohexane.

7. The improvement in accordance with claim 1 further comprising the step of dehydrating the obtained polymer before separating it from the reaction medium.

* * * * *

UNITED STATES PATENT OFFICE
CERTIFICATE OF CORRECTION

Patent No. 3,957,739                    Dated May 18, 1976

Inventor(s) Jean CABESTANY and Erich SCHAEFFER

It is certified that error appears in the above-identified patent and that said Letters Patent are hereby corrected as shown below:

Title Page, [75] Inventors:, the second inventor's last name should read: SCHAEFFER

*Signed and Sealed this*

*Twenty-sixth* Day of *February 1980*

[SEAL]

Attest:

SIDNEY A. DIAMOND

*Attesting Officer*     *Commissioner of Patents and Trademarks*